US008221125B2

(12) United States Patent
Darling

(10) Patent No.: US 8,221,125 B2
(45) Date of Patent: Jul. 17, 2012

(54) ELECTRONIC PRESENTATION OF WORLD TIME ZONES

(75) Inventor: Dwight Darling, Brockville (CA)

(73) Assignee: World View Time Inc., Brockville, Ontario (CA)

( * ) Notice: Subject to any disclaimer, the term of this patent is extended or adjusted under 35 U.S.C. 154(b) by 0 days.

(21) Appl. No.: 13/058,909

(22) PCT Filed: Aug. 13, 2009

(86) PCT No.: PCT/CA2009/001115
§ 371 (c)(1),
(2), (4) Date: Feb. 14, 2011

(87) PCT Pub. No.: WO2010/017627
PCT Pub. Date: Feb. 18, 2010

(65) Prior Publication Data
US 2011/0151415 A1      Jun. 23, 2011

(51) Int. Cl.
*G04B 19/22* (2006.01)
(52) U.S. Cl. .......................................... 434/149; 368/21
(58) Field of Classification Search .................. 434/149;
705/8, 7.34; 368/21–24
See application file for complete search history.

(56) References Cited

U.S. PATENT DOCUMENTS

| 434,137 | A | 8/1890 | Plechawski |
| 557,173 | A | 3/1896 | Thompson |
| 594,410 | A | 11/1897 | Margolis |
| 718,579 | A | 1/1903 | Phiels |
| 862,884 | A | 8/1907 | Connor |
| 1,045,304 | A | 11/1912 | Luporini |
| 2,001,633 | A | 5/1935 | Segovia |
| 2,128,970 | A | 9/1938 | Smyser et al. |
| 3,091,915 | A | 6/1963 | Pawl |
| 3,226,926 | A | 1/1966 | Kilburg |
| 3,232,038 | A | 2/1966 | Smith |
| 3,302,387 | A | 2/1967 | Wedde |
| 3,316,706 | A | 5/1967 | Kilburg |
| 3,472,021 | A | 10/1969 | Karakawa |
| 3,918,251 | A | 11/1975 | Wakabayashi |
| 3,940,920 | A | * 3/1976 | Nakamura et al. .............. 368/22 |
| 5,007,033 | A | 4/1991 | Kubota et al. |
| 5,054,008 | A | 10/1991 | Darling |
| 5,146,436 | A | 9/1992 | Wright |

(Continued)

FOREIGN PATENT DOCUMENTS

CA      1305864      8/1992

(Continued)

*Primary Examiner* — Kang Hu

(57) ABSTRACT

An electronically generated simultaneous display of the local time within multiple time zones in the world is adjusted to accommodate local time arising from Daylight Saving Time. A preferred modified south polar projection of the Earth which schematically depicts the Northern Hemisphere is divided into geographical time zones. Each geographic time zone is associated with a time marker that points to an adjacent time scale. Either the geographical time zones or the time markers are adjusted in order to correctly display the ongoing time changes resulting from the continuous observation of Daylight Saving Time in time zones of the world. As further features, a user may adjust the display to present a hypothetical time and the corresponding times experienced in different time zones around the world. A user may have a specific time zone highlighted by invoking data, such as a city name, a telephone area code or an address book contact reference, which is associated with specific time zone. Conversely, highlighting a time zone may invoke a list of data associated with that time zone, e.g. city names, countries.

18 Claims, 12 Drawing Sheets

U.S. PATENT DOCUMENTS

| | | |
|---|---|---|
| 5,237,544 A | 8/1993 | Sase et al. |
| 5,845,257 A | 12/1998 | Fu et al. |
| 5,917,778 A | 6/1999 | James et al. |
| 6,233,204 B1 | 5/2001 | Chu et al. |
| 6,275,449 B1 | 8/2001 | Wang |
| 6,647,370 B1 | 11/2003 | Fu et al. |
| 2006/0171256 A1 | 8/2006 | Herbert |
| 2007/0121425 A1 | 5/2007 | Eble et al. |
| 2007/0183266 A1 | 8/2007 | Han |

FOREIGN PATENT DOCUMENTS

| | | |
|---|---|---|
| EP | 1571508 | 9/2005 |

* cited by examiner

ELECTRONIC PRESENTATION OF WORLD TIME ZONES

BACKGROUND TO THE INVENTION

1. Field of the Invention

This invention relates in general to timekeeping, and more specifically to the rapid and facile determination of the effective local civil time for any specific geographical location in the world. The invention, in particular, addresses this, while automatically accounting for Daylight Saving Time adjustments that may be effected in any particular locale.

2. Description of the Prior Art

It is well known in the art to provide a clock that simultaneously displays the time across various, if not all, time zones around the world. The word "Clock" as used herein is meant to include all forms of timepieces or means for recording and displaying the passage of time. As such, a clock represents a dynamic display. Corresponding times within different world time zones may also be presented graphically in a static format.

(Conventional Clock Dials in General)

The representation of time on a standard dial clock's face is often thought to trace back to early people's familiarity with sundials. In the most common design of sundial, a graduated time scale in imprinted on a horizontal surface, which is then aligned in a direction facing along the line between true North and South. A shadow-casting style or gnomon is arranged with respect to the graduated surface, such that the shadow caused by the relative movement of the sun throughout the day will fall upon and intercept the graduated time scale and indicate the local solar time.

While a sundial can be made very accurate and precise in the determination of solar time for a given locale, it can only be useful if and when the sun is sufficiently bright to cast a distinct shadow. This rather severe operational limitation has led throughout history to the invention of dial clocks which substituted a mechanical movement driving an indicator hand to substitute for the moving shadow of the sun. As the mechanical clock's hand or hands were intended to be an analogue or metaphor for a solar shadow, mechanical dial clocks have most commonly moved the indicator hand or hands in the same direction the gnomon shadow moves on a sundial throughout the day. This is the direction that we now commonly call clockwise.

(Clock Dials Incorporating a Polar Projection.)

With the advent of the industrial age, and with improvements in the science and art of cartography, clock designers hit upon the idea of combining a presentation of the Earth's surface with a mechanical clock, in order to indicate the differing local times at various locales. Many of these approaches resulted in multi-zone world time clock designs which made use of a circular world map, centered on either the North or South pole, and which operated in a manner that is mechanically similar to that of a standard two-handed clock movement. These types of clocks typically segment the world map into the various known time zones, and provide a means to allow a user to read the local time at each time zone simultaneously.

When incorporating a polar projection world map into a standard dial clock display driven by a conventional mechanical clock movement, a South polar projection of the Earth has an advantage, apart from merely depicting the world as a circular image. In a South polar projection, the graphic presentation of the Earth may rotate clockwise in the manner of a standard dial clock with the corresponding times indicated by a fixed encircling 24 hour scale. Conversely, the adoption of a North polar projection requires either that the graphic projection rotate counterclockwise against a fixed 24-hour time scale that increases in the counterclockwise direction; or that the time scale rotates about the geographic projection This would be unnatural to the clock's observers.

One example of a mechanical clock with a North polar world map projection and counterclockwise mechanical movement can be seen in FIG. 1 of U.S. Pat. No. 5,57,173, granted in 1896 to D. W. Thompson.

The other approach, maintaining clockwise movement of a map projection centered on the Earth's South pole, can be seen in FIG. 1 of U.S. Pat. No. 5,146,436 by James B. Wright. Wright teaches of a mechanical world clock having a circular polar map which is divided into twenty-four zones. Overlying this map are twenty-four, radially extending hour indicators, each serving to indicate the local time at each individual time zone by pointing-out times on an encircling 24 hour scale. Two of these indicators are made particularly distinctive over the others, and are adjusted to correspond to a user's present geographical location and time zone. The first of the two indicators is meant to indicate the user's standard local time, whereas the second indicator, positioned adjacent to the first, is meant to represent adjusted local time, such a daylight saving time. The user is expected to know which of the indicators corresponds with appropriate, actual time in the local time zone.

One hybrid world clock design which maintains a standard clockwise hand movement and incorporates a North polar map projection is described in U.S. Pat. No. 862,884, to P. G. Connor. Connor's geographical clock makes use of a moving annular time indication scale, which has the 24 hours of the day numbered in ascending order counterclockwise. This annular scale is itself secured to the hour hand of a conventional 24 hour clockwise movement. The reverse-numbered annular scale is preferably made of a transparent material to allow for viewing the map below. The annular scale then rotates with the hour hand about the centre of the map projection, giving an indication of the local time in any area on the map.

The present inventor, Dwight Darling, has also obtained U.S. Pat. No. 5,054,008 for a mechanical or electro-mechanical movement clock with a clock face based on a modified South polar projection of the world and clockwise map movement. The geographic projection of this previous invention relies on colours to identify specific time zones and correspondingly coloured peripheral indicators are provided around the circumference of the South polar projection pointing to the exterior, fixed, 24-hour scale.

(Linear Clocks Incorporating a Mercator Projection.)

In addition to the polar projections described above, there are many multi-zone world clocks in existence which make use of a more conventional Mercator projection map of the world, segregated into the 24 or more distinct time zones, and employ various methods of displaying the local time of each individual time zone. No provision is made in the system to accommodate changes to daylight saving time.

A 1966 U.S. Pat. No. 3,232,038 to Smith, describes a mechanical multi-zone world clock which has a display consisting of a Mercator projection map of the Earth. The map is perforated with a series of window-like apertures at specific locations. An indexed display tape or film is driven by a sprocket transport at a fixed rate behind the map in order that the viewer can read time index numbers through the map's viewing windows.

In later efforts, multi-zone clocks have been designed which leverage electronic means of display in the place of mechanical systems. One example can be found in U.S. Pat.

No. 6,233,204 to Chu et al., where a multi-zone clock is provided which comprises a Mercator projection of the Earth with 24 discrete display windows for the separate time zones. Each display window is furnished with a Light Emitting Diode display, which presents the local civil time in its given time zone, and a coloured symbol is applied to label countries which practice Daylight Saving Time adjustment. Viewers in such case must mentally calculate the actual time in the daylight savings time zone.

Two other U.S. Pat. Nos. 5,845,257 and 6,647,370, to Fu et al., disclose methods for assisting a user in managing events across time zones. These methods also provide a Mercator projection of the Earth, with digital readouts arrayed about the map which can be set to display the current effective civil time in a number of locations of interest. The methods describe a user interface which allows the operator to choose a time to be associated with a computer recorded event. The time may be referenced to the operator's home time zone, the local time zone, or another remote time zone.

Another electronically-based world time presentation system, U.S. Pat. No. 5,007,033 to Kubota et al., provides a Mercator projection map of the Earth, with a digital display unit positioned upon it. A series of selector push-button switches are arrayed beneath the map, with each button labeled with an index number and the name of an assigned city. When the operator activates one of the selector switches, the digital display unit presents the chosen city's index number and the local civil time for that location.

(The Issue of Daylight Saving Time.)

Regardless of the chosen map projection, it is a fact that throughout the course of the calendar year various regions around the world will adjust their local time in observance of Daylight Saving Time (DST). Not every time zone in the world, however, shifts to Daylight Saving Time during the year. The majority of North America and Europe, as well as parts of South America and Asia observe some form of Daylight Saving Time. These changes will typically involve advancing local time by one hour at one point in the calendar year and then retarding local time by one hour at a second point of the calendar year. For example, in North America, time advancement is typically carried out during the Spring, and the reduction in time is typically carried out in the Fall. In parts of Africa, however, the advancement of local time takes place in the Fall, and the reduction of local time takes place in the Spring.

When the local time of certain regions of the world is advanced, or reduced as a result of Daylight Saving Time, clocks displaying world time typically must accommodate such changes in order to correctly display local time across each time zone, or be inaccurate. The usefulness of these types of clocks may be greatly diminished if such an accommodation cannot be made.

The situation is made even more complicated because some time zones are on the half-hour. For example, the time zone for Newfoundland Canada is only a half hour earlier than the time zone for the Canadian Maritime provinces. Similar instances occur in respect of other regions around the world.

A further complication is that there are standard time zones in the world wherein only a portion of the territory of such standard time zones adjusts the time for daylight saving.

The aforementioned Polar projection world clock of U.S. Pat. No. 5,146,436 to Wright, in providing a second indicator to represent local time, can be adjusted in observance of Daylight Saving Time. While Wright's design thus does provide a means to adjust the user's current geographical location time in accordance to Daylight Saving Time, it does not provide a means to correct the time within other time zones across the world which may also implement Daylight Saving Time.

In I. Smith's linear Mercator projection world time clock of U.S. Pat. No. 3,232,038, the position of the viewing window may be mechanically shifted parallel to the length of the scrolling band, thereby providing an avenue to correct a particular region's local time when Daylight Saving Time is in force. Again here, no general solution is provided to the issue of differing dates being used in various geographical regions and sub-regions for the application of Daylight Saving Time corrections.

Modern communications rely greatly on computers with electronically controlled presentation displays, and long distance telephony. In the case of computers, electronic messages are sent continuously by e-mail and other means over the Internet to destinations around the world. Similarly, long distance telephone call set-up may occur at any time of the day or night. When communicating to others across civil time zones, a person often needs a quick and convenient method for determining the local time at the target distant location.

It would be convenient to provide an electronic display for a clock incorporating a cartographic projection of the Earth. Further, it would be convenient to provide in such a display a means to accommodate changes due to Daylight Saving Time on a region-by-region basis, as well as other useful features. The present invention seeks to address such objectives by taking advantage of modern technology relating to electronically displayed images.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention, an electronically controlled graphic display system is provided for effecting a user presentation which simultaneously displays the local civil time in various civil time zones around the world. This may be in the form of an electronic presentation of a clock face with a graphic image depicting the world's time zones, simultaneously indicating the local time in such time zones around the world. Preferably this display, however presented, is adjusted by an automatic mechanism to accommodate regional time changes due to Daylight Saving Time.

According to a more specific aspect of the invention, a cartographic projection, which may be in the form of a map or image of the Earth or a portion of the Earth's surface, is divided into a series of colour-coded or otherwise visually distinguished geographical time areas, with each area representing a region sharing a given civil time zone. This cartographic projection is presented on an electronically controlled graphic display element by an electronic display controller. The graphic display element may, for example, be a conventional computer workstation display or public presentation device, a portable LCD display device as may be found in an Internet-enabled cellular telephone or personal digital assistant, or may in the form of a dedicated display device embedded in the central area of a wall or desk clock, or wristwatch face, in order to add functionality to these timepieces.

The electronic display controller may take the form of a digital micro-controller system, a general purpose stored program computer or microcomputer, or a distributed electronic data processing system composed of any number of electronic information processing hosts connected for information transmission via suitable data communications media.

In one variant of the invention, the cartographic projection may be, or may be derived from, a satellite, aerial or other image, and which may have the geographical areas denoted through the superimposition of reference markings or by false colouring techniques.

According to yet another aspect of the invention, the display controller is provided with or has access to a clocking subsystem capable of determining the actual time and thereby providing the local effective civil time corresponding to each of a series of geographical time areas. The display controller may also be provided with a digital record store or database, or has access to such sources, containing a list of the geographical time areas and their locations on the cartographic projection. The digital record database may also contain each geographical area's standard time offset from Coordinated Universal Time, and preferentially the effective calendar date that each geographical area adjusts the prevailing local civil time to introduce or remove a Daylight Saving Time correction.

In another aspect of the invention, the display controller may present on the electronic display a time scale, comprising a series of time values in the form of time indicators present along part or all of the periphery of the cartographic projection. Also along the periphery of the cartographic projection the controller may display a series of colour or otherwise visually coded time zone time markers which coordinate with the colouring or coding of the geographic time areas. Preferably, these time zone time markers are located so as to index against the time indicators present in the time scale presentation and thereby provide each zone's effective civil time. Optionally and preferably such time markers are triangular in shape or otherwise shaped in order to more precisely indicate a specific time on the time scale at a level which is more detailed than simply indicating the hour. This is an alternative to providing a minute hand on the clock. A minute hand may also, optionally, be present.

In another aspect of the invention, the display controller may periodically reference the clocking subsystem, and when such action is indicated, change the relative positions of the time zone time markers, in order that the markers continue to correctly index against the correct indicators of the indication scale and track with the local civil times of the geographic areas with the passage of time.

According to one preferred aspect of the invention, the display controller may periodically reference the effective calendar date determined by the clocking subsystem, and compare this date to the dates stored in the digital record database representing when each geographical area is expected to apply or remove a Daylight Saving Time adjustment. In this preferred aspect, the display controller may change the colours or other coding of the geographic time areas on the cartographic projection to redistribute these areas as required by local time changes. Alternately, the corresponding locations of related time zone time markers can be shifted to indicate the correct, adjusted, time.

In a first preferred embodiment of the invention, the cartographic projection of the Earth's surface may be in the form of modified polar projection, centered on the South pole. The projection is modified to show schematically time zone regions actually present in the northern hemisphere. This South polar projection may be electronically presented to the viewer as rotating about its centre point in the clockwise direction at the rate of 24 hours per rotation. The depiction of the world may be divided into approximately twenty-four geographical time areas representing time zones wherein each region is provided with a colour-coding to visibly distinguish the respective time zone regions.

In a variant form of this embodiment, the modified polar projection may be centered on the North pole, in which case it may be depicted as rotating about its centre point in a counter-clockwise direction, again at a rate of 24 hours per cycle.

According to the polar projection embodiments, the electronic presentation may represent the time scale in the form of a series of time indicia located around the outer, circular periphery of the polar projection. These indicia may fully encircle the periphery of the polar projection, and may be distributed at substantially equal distances from one another whether or not adjacent geographical time areas differ by one hour.

According to another feature of the polar projection embodiments, the time zone time markers rotate synchronously with the world map. Each time marker is associated with a proximate geographic time zone located on the map, and may be appropriately colour-coded or otherwise visually cued to indicate and correspond to an associated time zone or geographical time area. The presentation depicts the circular world map and coloured/coded time zone time markers as rotating periodically with respect to the time indicia on the 24-hour dial such that the alignment of the time markers with respect to the 24-hour time indicators provides the local time of each geographical time zone shown on the map.

In an alternate presentation of the polar projection variants of the invention, the relative positions of the map and time zone time markers may be fixed, and the time scale indicia within the time scale may then rotate around the map and markers. In such case, the alignment of the time markers with respect to the 24-hour time scale indicia indicates the local time of each geographical time zone shown on the map.

In a second preferred embodiment of the invention, the cartographic projection of the Earth's surface may be in the form of a conventional or modified Mercator projection. This Mercator projection may also be divided into approximately twenty-four geographical time areas representing time zones wherein each region is provided with a colour or alternate form of coding to visibly distinguish the respective time zone regions. Time zone time markers are positioned along the upper peripheral edge of the polar projection, the lower peripheral edge, or both.

According to this embodiment, the electronic presentation may represent the time scale in the form of a series of time indicia located along the upper peripheral edge of the Mercator projection, the lower peripheral edge, or both. These indicia may fully extend along the upper or lower border of the Mercator projection, and may be distributed at substantially equal distances from one another.

In another aspect of the Mercator projection embodiments, the time zone time markers may move laterally with respect to the timescale. In this embodiment the presentation may depict the Mercator projection world map and coloured time markers as sliding laterally over time with respect to the time indicia on the linear 24-hour dial such that the alignment of the time markers with respect to the 24-hour time indicia indicates the local time of each geographical time zone shown on the map.

In an alternate presentation of the Mercator projection variants of the invention, the relative positions of the map and time zone time markers may be fixed, and the time indicia may then move linearly with respect to the map and markers. This ensures that the alignment of the time markers with respect to the 24-hour time indicia continues to indicate the local time of each geographical time zone shown on the map while presenting a stable geographic image of the world.

With either Polar or Mercator projection embodiments, a single 24 hour time scale or display of time indicia may be provided. Conventionally and preferably, a series of numbers are evenly spaced along the scale at points corresponding to 15° intervals of longitude with optional subdivisions indicating portions of an hour. These numbers may run from 1 to 24 or may run in two series, each from 1 to 12, with the optional but preferred presence of an indication that these series are to indicate time on the dark side of the Earth and on the side of the Earth that is illuminated by sunlight. As the time that the sun rises and sets changes, different sections of times may represent the night and day.

In the preferred embodiment of the invention, the display controller apparatus effecting an electronic presentation of a clock is provided with Daylight Saving adjustment capability. These adjustments are achieved according to one option through selectively shifting the position of, and optionally the nature of, the coloured or otherwise visually discriminated time markers corresponding to regions adopting local time changes. The display for such time markers may be shifted with respect to the time scale indicia by a distance corresponding to the change arising from entering or leaving Daylight Saving Time, as for example one hour on the time indicia scale. Thus in changing the position of a time indicator, the local time of the corresponding time zone may be indicated as advanced or reduced by one hour in accordance with Daylight Saving Time requirements.

Where a shifted time marker is moved to a position already occupied by another time marker, both markers may be modified in shape to share the same location. Thus equilateral triangles can be reduced to half size in order to share space with another time indicator that is colored to match another time zone that is on the same time as, for example, a region that does not shift to daylight savings.

An advantage to having the time markers, each of a given colour, or otherwise visually denoted, shifted in their position along or around the periphery of the world map to accommodate a change to or from Daylight Saving in the corresponding territorial regions, is that the presentation of the corresponding territorial regions need not change. Thus the appearance of the world map in its polar or Mercator or other projection will be largely undisturbed for the benefit of the perception of persons viewing this presentation.

In instances where only a territorial fraction of a particular time zone observes Daylight Saving Time, the specific subregion within such time-zone which does not observe Daylight Saving Time may be re-coloured or visually marked in the display to adopt a reference scheme corresponding to an adjacent time zone having the same time. The result is that the non-observing region acquires a visual cue which corresponds to a new time marker which displays its correct local time.

In regions where the majority of territories shift to Daylight Saving Time, this procedure of shifting the position of the time markers has the advantage of minimizing departures from the traditional colours or markings provided to time zone regions. Correspondingly, the expectations of viewers as to the colours or markings of specific territories are minimally disrupted.

In an alternative embodiment, the presentation adjusts the clock display for regional time changes due to Daylight Saving Time through selectively redistributing the visual coding provided to one or more geographical time regions. The redistribution is effected so that that appropriate geographical time zone regions become associated with time markers which bear the same visual coding and correctly indicate their local time. In this embodiment, no shifting in the position of the individual time markers occurs.

In the case of regions which are functioning on the half hour, additional time markers beyond the normal 24 can be provided. If the normal time markers are triangular in form, e.g. equilateral triangles in shape, then additional partial triangles or other indicator images may be inserted halfway between adjacent triangles, sharing a common time indication.

Rather than adopt an additional visual coding for such a half-hour territories and half-hour time indicators, the visual coding of an adjacent, synchronous time zone may be adopted with the addition of crosshatching or other modification to the territory and indicator that will distinguish them both from adjacent territories and indicators. Optionally, with such additional distinctive feature as crosshatching applied to a territory, the depiction of an additional half-hour time indicator need not be adopted. Instead, the user will simply understand that crosshatching is an indication of a one half hour time shift, typically a half-hour advancement in time where the half-hour time zone carries the background visual coding of the next adjacent time zone territory in the counterclockwise direction.

As a further variant on the invention the time markers (adjacent to the clock scale) may incorporate a designation or code for a related geographic location present within the associated time zone. For example, the marker for eastern North America could include the words "New York". As a complementary variant, the display according to the invention may, for a highlighted time zone selected by users for highlighting, provide a list again selected by a user, of countries within the time zone and/or cities or other important references within the time zone which qualify as significant information, so that a user can confirm that they have selected the correct time zone that includes the target geographic entity. A list of references may include entities providing commercial services, such as hotels, within the geographical area.

In one further embodiment, the current invention may be combined with a reference database including data points associated with the specific time zone. This could include a country or city within the time zone, a phone number with an area code within the time zone or a folder that contains the contact particulars for a specific person associated with the time zone By this embodiment, when a contact is selected in the address book/contact list, etc., the time zone of the contact as an exemplary data point may be highlighted. As an example in the case of time zones with colors, the associated time zone may be highlighted by having its color changed, as for example to being white. Selection of such a data point would then allow a user to locate the time zone in which such data point is located. This helps a user understand the time that another person is experiencing. This may be implemented by including within the controller a controller submodule that will associate the geographic area to be highlighted on the display with the reference database entry corresponding with the data points.

As a further, variant on the invention, the depiction of the map on the display may be manipulated by a user through an input control so that the map may be manually rotated within the time scale to a user-selected hypothetical time. This function may optionally operate without including the dynamic feature of a real-time clock. This function provides an easy means for determining the relationship between the time at two or more points on the Earth at any hypothetical time. By setting the time marker of one time zone to a specific time, the corresponding time in all other time zones can be seen. Using a touch-sensitive screen display or a key command or equivalent to permit manual displacement of the map with respect to the time scale, the new set of corresponding times set by a user may persist on the display for a predetermined delay, and then return automatically or "snap-back" to displaying the correct time.

The foregoing summarizes the principal features of the invention and some of its optional aspects. These features may be applied to other projections of the Earth in part or in full, for example the Mercator projection or a north polar projection. The invention may be further understood by the description of the preferred embodiments, in conjunction with the drawings, which now follow.

DESCRIPTION OF THE PREFERRED EMBODIMENTS

Figure 1:
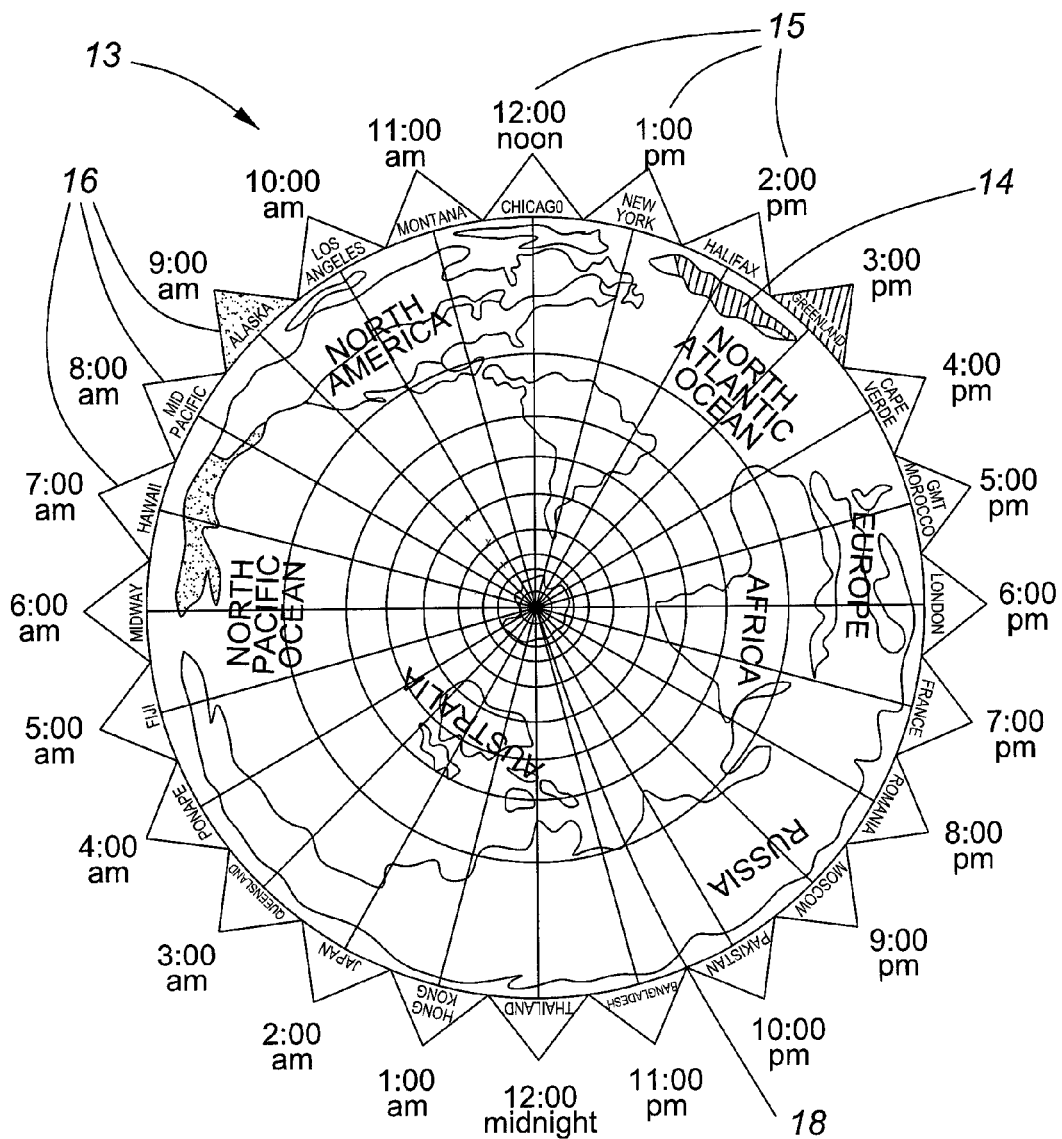
FIG. 1 is a view of the clock face presentation of one variant of the invention that comprises a modified South polar projection of the world map separated into time zones and visually coded with colours that associate a series of time zone time markers with geographical areas.

In one embodiment of the invention, as depicted in FIG. 1, a world time presentation is provided, comprising an electronic presentation of a circular clock face 13 which simultaneously displays the geography for the local time in time zones around the world. The presentation is centered about a modified South polar projection 18, thus rendering a recognizable world map of the Earth's surface.

Also shown in FIG. 1 is the manner in which the rotating world map 18 is divided into approximately twenty-four geographical time areas 14 representing time zones wherein each region is preferably provided with a colour-coding or other visual convention to visibly distinguish the respective regions. For clarity in FIGS. 1 and 2, only two zones are marked, although in practice most or all of the geographic areas 14 would be visually encoded.

A series of indicia in the form of numerical hour indicators 15 are evenly spaced around the periphery at 15° intervals to form a graduated annular time scale. These numbers may run as shown in FIG. 1, around the periphery of the circular map 18 in two series, ascending from 1 to 12, in this case optionally bearing an AM or PM indication. Alternately, the hour indicators may each ascending from 1 to 24, as in a standard 24 hour clock representation.

Figure 12:
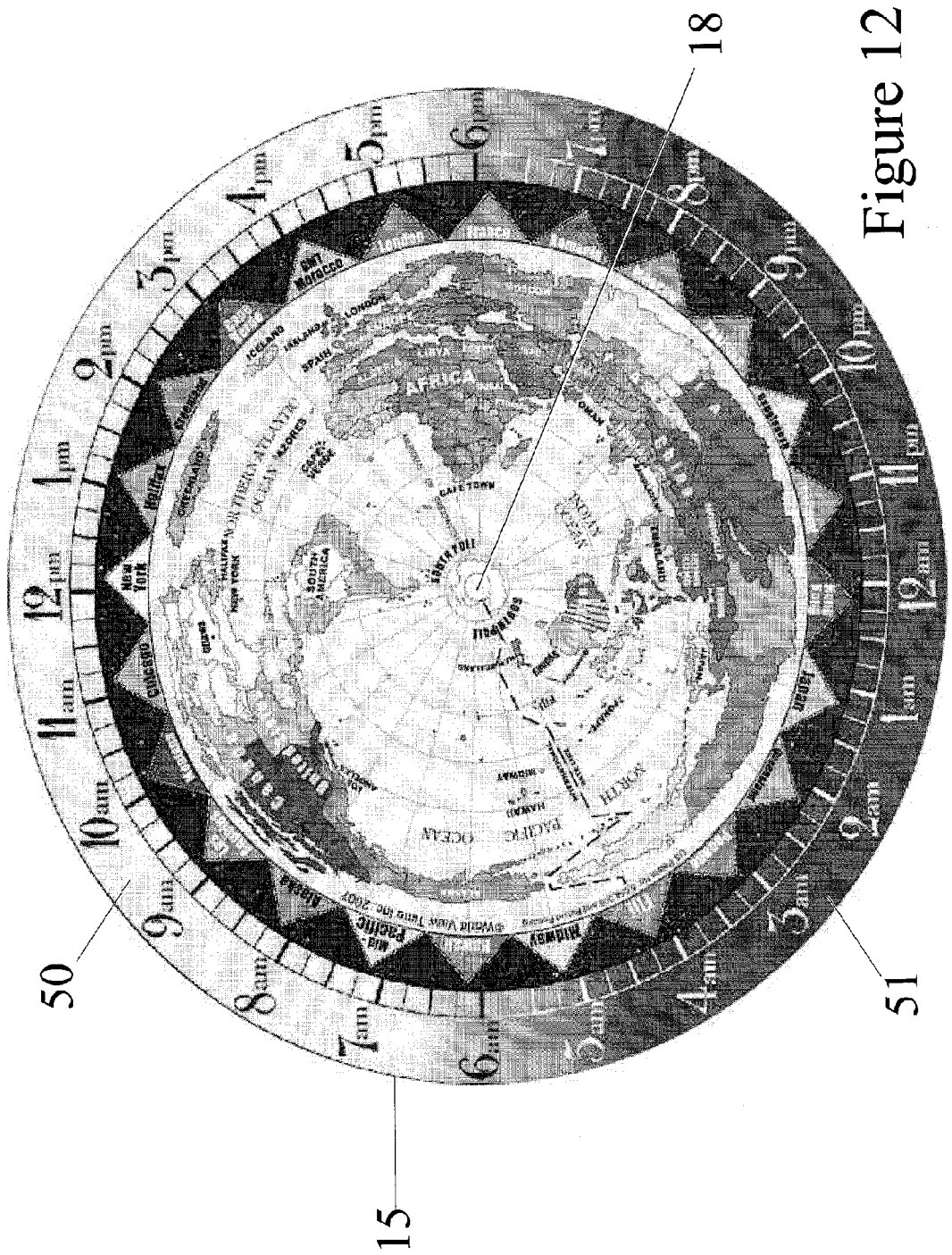
FIG. 12 depicts a rendition of the presentation display of one embodiment of the invention, with a more detailed presentation of the modified South polar projection map of the Earth.

In another optional but preferred indication, which may be seen in FIG. 12, the hour indicators 15 of the annular time scale encircling world map 18 may be provided with a shading or other visual cue to distinguish times on the dark side 51 of the Earth from times on the daylight side 50 of the Earth that is illuminated by sunlight. In this case, the display controller 25 may simply present the numbers representing solar illuminated hours as those in the hemisphere divided by local noon, preferably compensated for any Daylight Saving Time correction in effect.

Also contemplated by the invention, but not shown in the Figures, the world clock presentation 13 may include a further overlay including a traditional analog or digital time display as is known in the prior art, such overlay typically displaying the local civil time at the user's current location in a conventional manner. Thus minute and hour hands may rotate within an independent 12 or 24-hour dial.

As illustrated in FIG. 1, the world time presentation may include as part of its display a series of time zone time markers 16 disposed along the immediate periphery of the circular world map 18. These time zone time markers 16 rotate synchronously with the world map. As can be seen in the detail view of FIG. 3, each time zone time marker is associated with a proximate geographic time zone located on the map, and is appropriately coloured or otherwise visually coded to correspond to its associated time zone, with marker 50 corresponding to geographic area 52, marker 51 corresponding to geographical areas 53 and 60, and marker 54 corresponding to geographical area 55.

Figure 2:
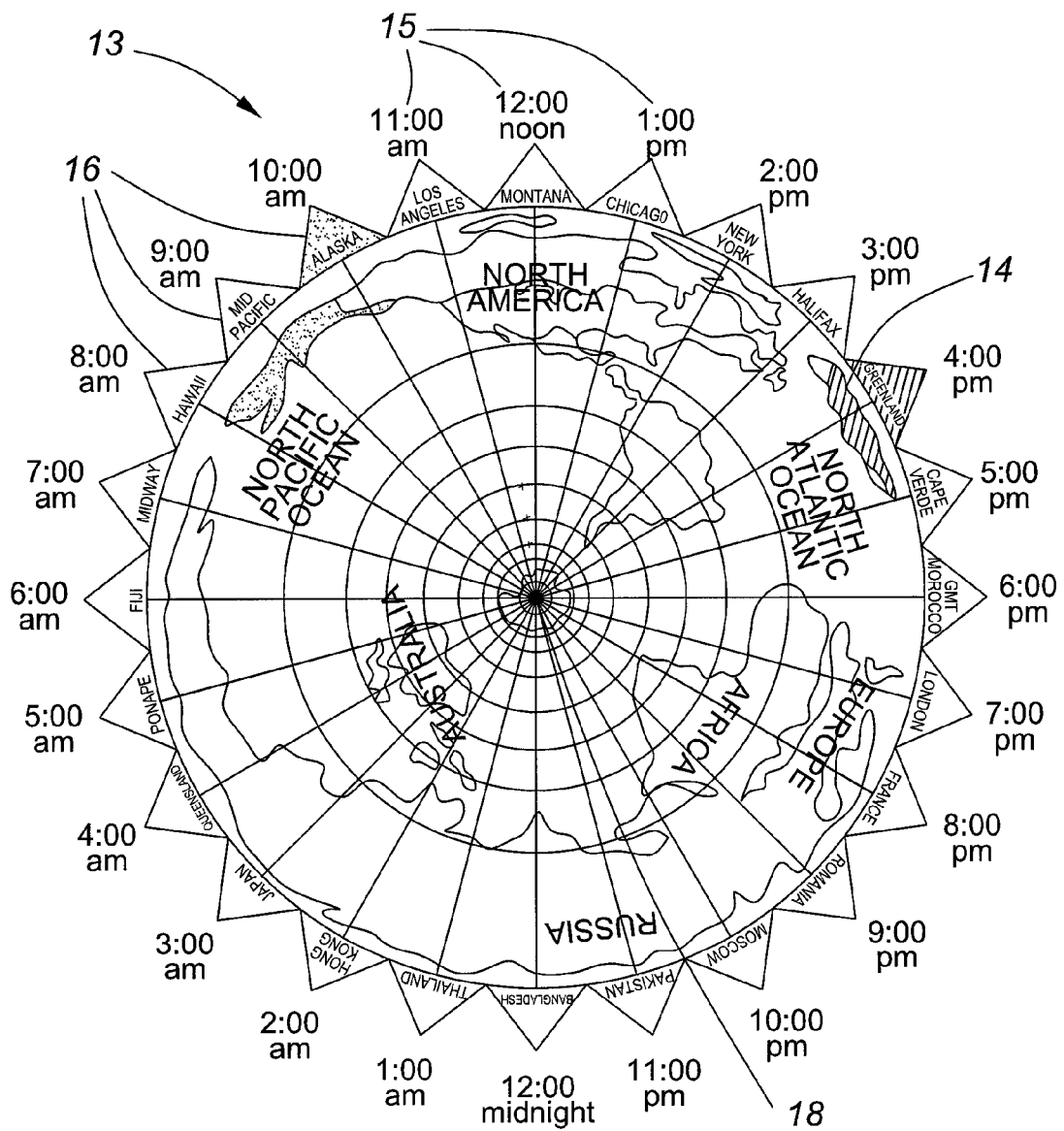
FIG. 2 is a view of the clock face presentation of one variant of the invention that comprises a modified South polar projection of the world map where the presentation has been adjusted from that of FIG. 1 in order to indicate Daylight Saving Time corrections in effect.

As shown in all the map bearing Figures, and perhaps best in FIGS. 1 and 2, the time zone time markers 16 are preferentially triangular in shape or otherwise shaped in order to precisely indicate a specific time on the annular time scale, including not only a specific hour but portions of an hour.

Figure 10:
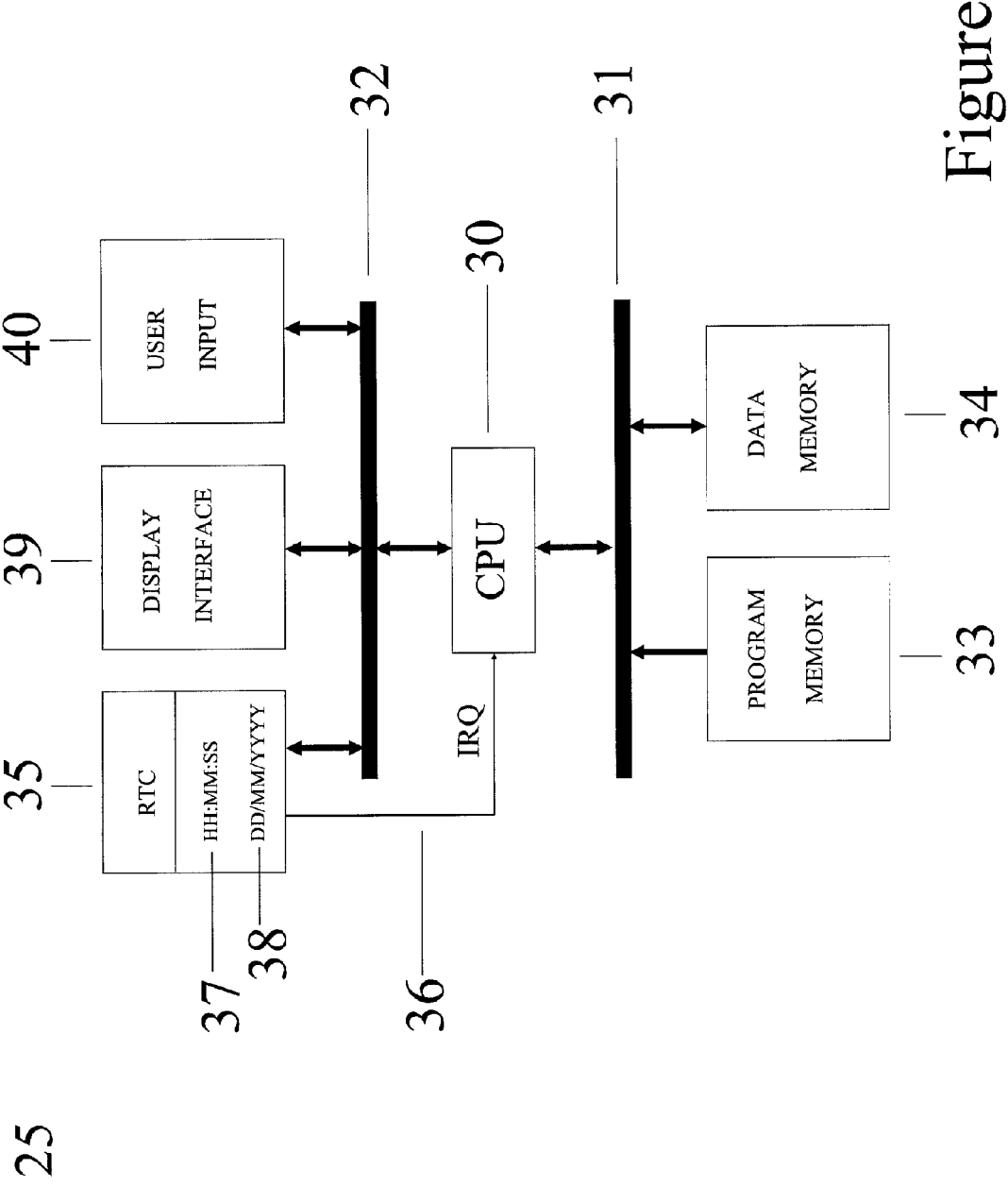
FIG. 10 illustrates in simplified functional block diagram an electronic computerized display controller system suitable for implementation of the world time clock of the present invention.

FIG. 10 illustrates in simplified functional block diagram an electronic computerized display controller system suitable for implementation of the world time clock of the present invention. For clarity of description, the components of the controller will be described with reference to a basic, generally Von Neumann design model of stored program computer, with program and data memory accessible to a processor via a common memory data transfer bus. It should be understood by the reader that this architecture is herein applied for exemplary purposes only, and in no way precludes any other alternate architectural configuration from being applied in the implementation of the world clock of the present invention. The actual implementation of the display controller system of the present invention is in practice an engineering decision based on the target application domain, and may utilize any viable alternate computing architecture, for example as distributed across a multi-node networked computing system such as the Internet, a virtual machine running in a segmented program execution environment of a larger data processing system, or as an integrated single chip microcontroller.

As depicted in FIG. 10, the display controller 25 comprises a central processing unit, or CPU 30, which is connected to a digital memory addressing and data transfer bus 31. Also connected to memory bus 31 are two data storage memories, a program memory 33 for the storage of instructions which govern the operation of CPU 30, and a data memory 34 wherein transient operational information can be stored and recalled during CPU program execution. The program storage memory 33 and data storage memory 34 may be separate subsystems, or may simply be dedicated regions of storage within a single memory array.

CPU 30 is also connected to an input/output (I/O) data bus 32 for communication with, and control of a number of peripheral devices. Display interface 39 provides control over the actual world clock presentation display, and preferentially provides a cartesian X/Y colour pixel addressing for the plotting of images and text.

Also connected to I/O bus 32 is a user input interface 40 for reading the system operator's control manipulations. The user input interface may externally connect to a keyboard, keypad or other configuration of switches, a pointing device such as a desktop computer mouse, or a touch-screen type peripheral capable of sensing the device operator's interactions with the images presented on the clock display presentation itself.

A timebase peripheral 35 is also connected to the display controller's I/O bus 32. Preferably, the timebase 35 is provided in the form of a real-time clock (RTC), which may automatically maintain an accurate and precise time-of-day mantissa 37, encoding the current Coordinated Universal Time (UTC). Also preferably, the timebase 35 may automatically maintain a separate date mantissa 38, encoding the current day of the year within the UTC time zone.

It will be evident to the reader that although the timebase peripheral 35 described above is suggestive of a hardware real-time clock or other timekeeping integrated circuit, this particular design option is by no means restrictive. Software implementations of an RTC function may equally well be utilized, and the specific provision of the timebase clock service may ideally be of a form suitable from cost, complexity, and performance perspectives.

However timebase 35 is effected, in the preferred embodiment it is of the highest practical accuracy, and of a precision suitable for the generation of a suitably meaningful world clock presentation, given the resolution of the attached electronic display device. In practice, the accuracy of timebase 35 may reflect a relatively simple free-running Quartz crystal derived reference, or the timebase may be synchronized to a more accurate higher order reference such as an atomic clock, either by terrestrial radio reception, GPS derived signaling, or via an Internet connection to a low stratum Network Time Protocol server.

Preferably, timebase 35 is provided with a low-latency strobe output 36 to CPU 30, whereby the timebase can signal the CPU of the arrival of some time-related occurrence. Low-latency strobe signal 36 may be in the form of a digital output connected to an Interrupt Request (IRQ) input of CPU 30, or may be a software event signal, as for example brokered through an underlying operating system's timer application programming interface.

Figure 11:
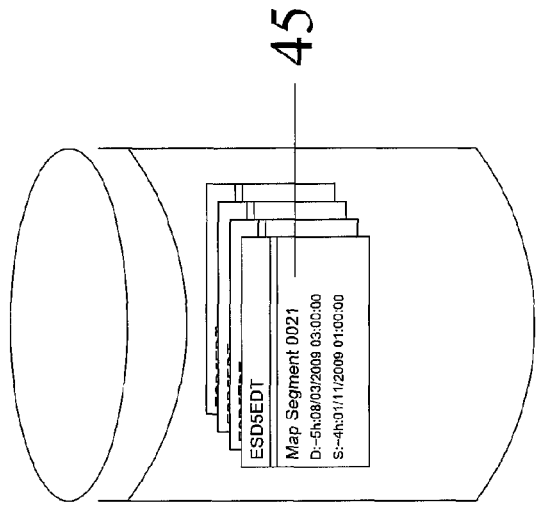
FIG. 11 depicts in general overview a data storage model that may be used to effect the invention.
Figure 11:
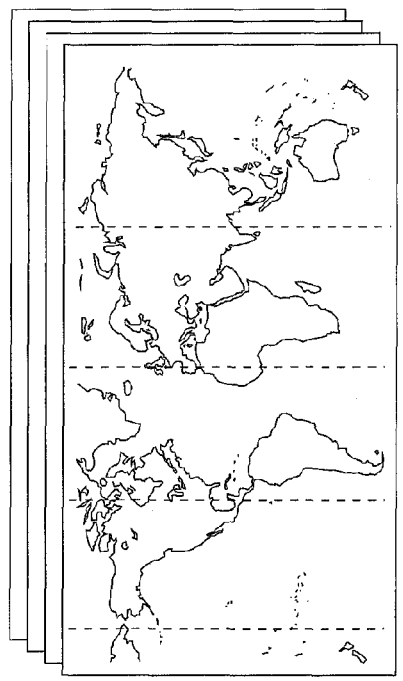

FIG. 11 depicts in general view a data storage model that may be used to effect the invention. Preferably, the display controller's data memory may be organized to provide at least one reference map image 42, which can be suitably transformed and plotted on the world clock's presentation device. In one variant of the invention, the CPU's real-time image transformation and processing load may be mitigated by caching a library of different presentation map images, with the individual map images in the library representing fairly common time zone configurations, as for example when a large area of the Earth's surface enacts a civil time correction simultaneously.

Also shown in FIG. 11 is a digital Time Zone database 44, which may comprise a series of geographical time area records 45. Preferably, each record corresponds to a particular geographical area of the reference world map presentation image 42, wherein the area a common civil time regime of UTC offset and DST correction is kept. Each record may comprise a reference to the corresponding geographical time area's location on reference image 42, and the area's normal standard time offset with respect to Coordinated Universal Time. Additionally, in areas that practice DST correction, the time area record 45 may further comprise the area's adjusted Daylight Saving Time offset from Coordinated Universal Time, and the dates of the year that the DST offset is to be introduced and removed. Optionally and preferably, geographic time area record 45 may also store the precise time of day that DST adjustments are to be made within the area. Optionally and alternately, such data may be accessed remotely by the controller, as for example, over the Internet.

As in some geographical time areas DST corrections are not applied on fixed calendar dates from year to year, but instead apply on a given weekday of a certain month, provision may be made to periodically update geographic time area records 45 to coincide with the current year. Such updates may be conducted automatically by the display controller's 25 program software, as by example with reference to a perpetual calendar calculation, or by electronic record download or user input.

Preferably, as shown in FIG. 11, the user's current effective time zone, and optionally, geographic locational coordinates 46 may also be stored in data memory. The coordinates may be user entered, or automatically derived via Global Positioning System or other reference methods. The local coordinates 46 may be used with suitable transformation, to allow the display controller 25 to compute and plot a current or home location on the map representing the operator's current position.

Turning again to FIG. 1, the display controller may present the passage of time by periodically changing the rotation angle of the modified South polar projection world map image 18 and its peripheral time zone time markers 16, such that the externally-facing tips of markers 16 register against the annular time scale 15 at appropriate positions to indicate the effective local civil time in each geographic time area. During the course of a calendar day, therefore, the map image 18 is presented to the viewer as rotating about its central polar point in the clockwise direction at the rate of 24 hours per rotation.

With reference to FIGS. 10 and 11, according to the preferred embodiment of the invention, the timebase 35 may periodically generate a low latency strobe signal 36 and present it to the CPU 30. Upon receipt of the strobe signal, CPU 30 then retrieves and executes a stored series of instructions from program memory 33, which may then cause it to fetch and copy the data comprising reference map image 42 into a suitable scratch or buffer area of memory (not shown in the Figures) for display image formulation.

The CPU 30 then executes a further stored series of instructions which may cause it to sequentially iterate over the geographical time area records 45, reading from timebase 35, comparing the current values of the date mantissa 38 and time mantissa 37 with the DST onset date and time, and determining the correct UTC offset in force within each geographical time area. Again following the stored instruction sequence, each area's UTC offset may then be divided by the 24 hours of a normal daily Earth revolution cycle, and the resulting fraction multiplied by the 360° angle of the full revolution to compute the time zone time marker position angle. CPU 30 may then execute instructions to plot the marker at the resultant marker position angle, and apply visual indications or colours to correlate the marker with the geographic time area on the buffered map image.

After all time zone time markers and map markings have been applied, CPU 30 may then execute a series of instructions to rotate the buffered image of the world map and time zone time markers to the correct orientation for the current time. This operation may comprise dividing the current UTC time reading from timebase mantissa 37 by the 24 hours of an Earth revolution cycle, and the resulting fraction multiplied by the 360° angle of revolution to compute the current map rotation angle. At this point, the final steps of image manipulation are to plot the annular time scale 15, optionally applying any desired day/night shadings, and to copy the completed rendition of map image 18 from the scratch buffer to the viewable display interface 39 for presentation.

It can also be seen that an alternative presentation approach is possible, whereby the map image 18 is kept at the reference or some other fixed angle, and the annular time scale 15 is rotated about it by the negation of the current map rotation angle before copying for presentation.

Figure 8:
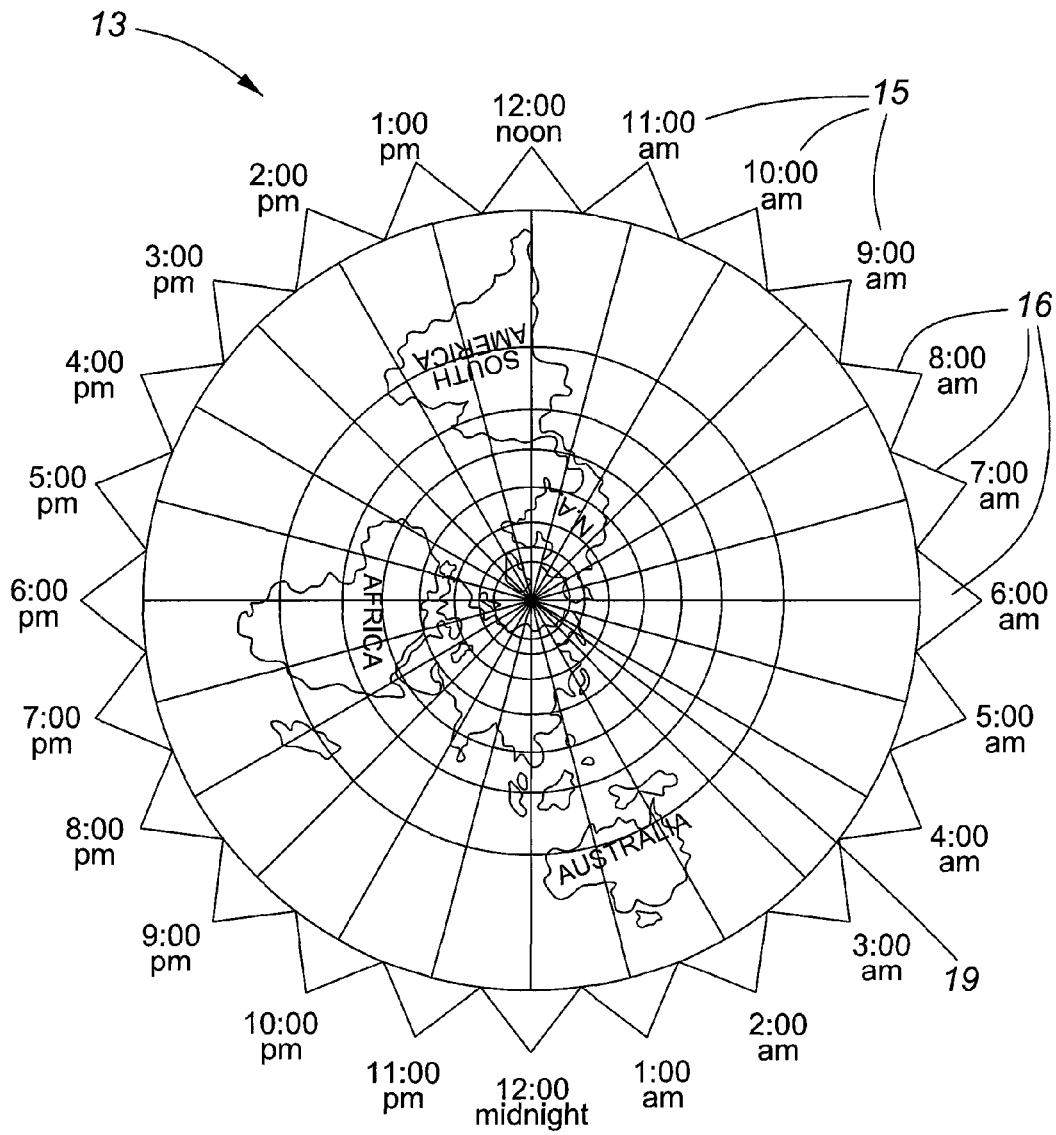
FIG. 8 is a view of the clock face presentation of another variant of the invention that comprises a modified North polar projection of the world map surrounded by an annular time indication scale and time zone time markers that associate with each specific time zone geographical area.

In FIG. 8 is shown an alternative embodiment of the world time display, wherein a North polar projection world map 19 is used, with preferably triangular and colour or otherwise visually encoded time zone time markers 16 arrayed about the periphery of map 19. In this case, the map 19 and markers 16 may be rotated counter-clockwise within the annular time scale 15, and the time scale may be numbered in ascending hour order in the counterclockwise direction, located around the outer, circular periphery of the world map 19. These indicia 15 fully encircle the periphery of the world time display 13 and are distributed at equal distances from one another.

The presentation depicts the circular world map 19 and coloured or otherwise visually coded time markers 16 as rotating periodically with respect to the time indicia 15 on the 24-hour dial such that the alignment of the time markers with respect to the 24-hour time indicia indicates the local time of each geographical time zone 14 shown on the map 18.

Again with reference to FIGS. 10 and 11, according to this alternative embodiment of the invention, the timebase 35 may periodically generate a low latency strobe signal 36 and present it to the CPU 30. Upon receipt of the strobe signal, CPU 30 then retrieves and executes a stored series of instructions from program memory 33, which may then cause it to fetch and copy the data comprising reference map image 42 into a suitable scratch or buffer area of memory (not shown in the Figures) for display image formulation.

The CPU 30 then executes a further stored series of instructions which may cause it to sequentially iterate over the geographical time area records 45, reading from timebase 35, comparing the current values of the date mantissa 38 and time mantissa 37 with the DST onset date and time, and determining the correct UTC offset in force within each geographical time area. Again following the stored instruction sequence, each area's UTC offset may then be negated, and the result be divided by the 24 hours of a normal daily Earth revolution cycle. This resulting fraction may then multiplied by the 360° angle of the full revolution to compute the time zone time marker position angle. CPU 30 may then execute instructions to plot the marker at the resultant marker position angle, and apply visual indications or colours to correlate the marker with the geographic time area on the buffered map image.

After all time zone time markers and map markings have been applied, CPU 30 may then execute a series of instructions to rotate the buffered image of the world map and time zone time markers to the correct orientation for the current time. This operation may comprise negating the current UTC time reading from timebase mantissa 37, and dividing the result by the 24 hours of an Earth revolution cycle. The consequent fraction of the Earth's rotation may then be multiplied by the 360° angle of revolution to compute the current map rotation angle. At this point, the final steps of image manipulation are to plot the annular time scale 15, optionally applying any desired day/night shadings, and to copy the completed rendition of map image 19 from the scratch buffer to the viewable display interface 39 for presentation.

It can here also be seen that an alternative presentation approach is possible, whereby the map image 19 is kept at the reference or some other fixed angle, and the annular time scale 15 is rotated about it by the non-negated current map rotation angle before copying for presentation.

Figure 9:
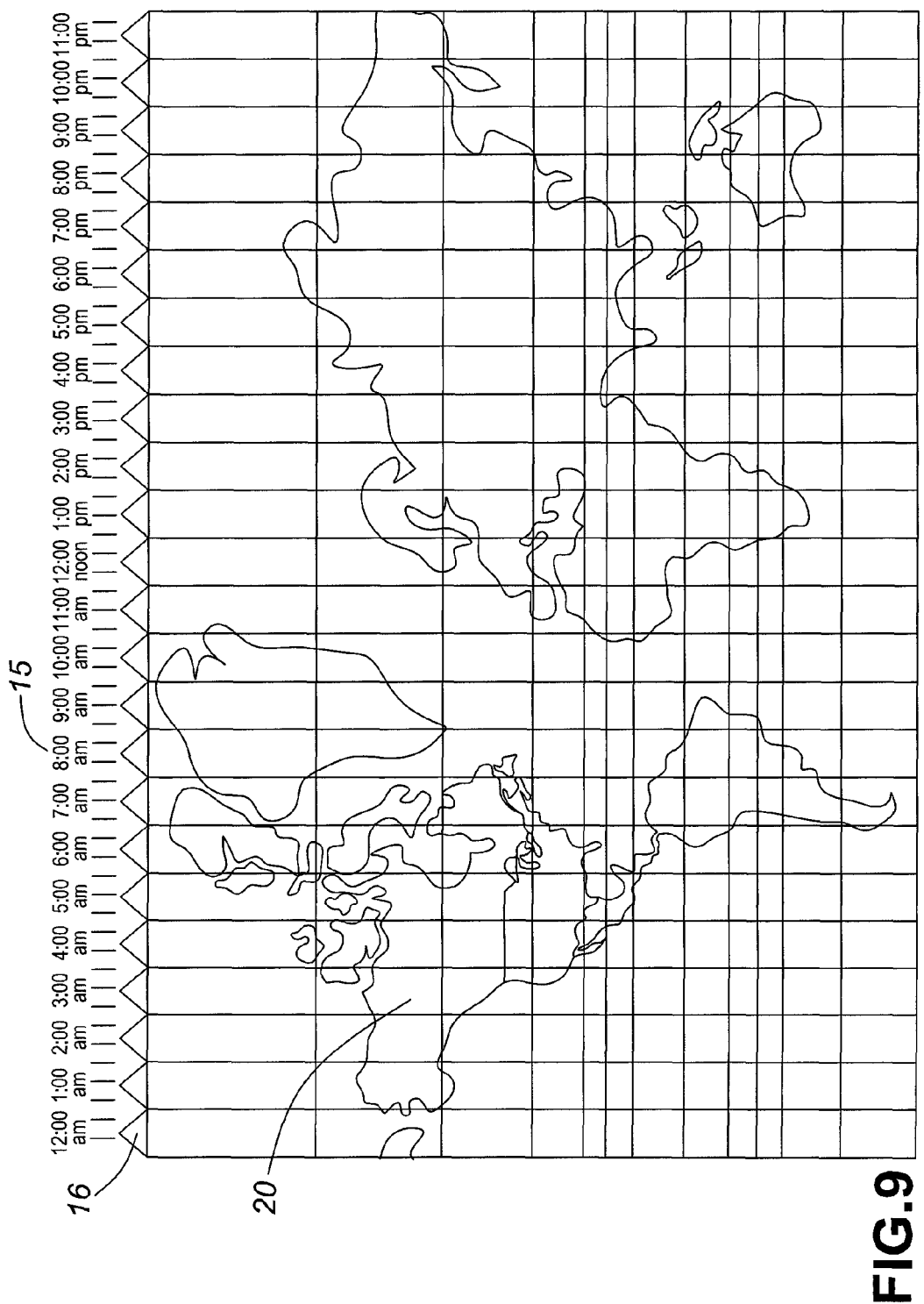
FIG. 9 is a view of the clock face presentation of another variant of the invention that comprises a Mercator projection of the world map bounded by a linear time indication scale and including time zone time markers that associate with each specific time zone geographical area.

In FIG. 9 is shown another alternative embodiment of the world time display, wherein a Mercator projection world map 20 is used, with preferably triangular and colour or otherwise visually encoded time zone time markers 16 arrayed about the periphery of map 20 in a manner logically similar to that of the polar projection embodiments described above. In this case, the map 20 and markers 16 may be translated linearly along the reference time scale 15, which is positioned and scaled to divide the width of Mercator projection into 24 equally spaced hour intervals. The time scale 15 may be numbered in ascending hour order in the left to right direction, and located along the top edge of the world map 20, such that time zone time markers 16 may index against scale 15 and indicate the local civil time in each associated geographical time zone.

The presentation depicts the Mercator projection world map 20 and coloured or otherwise visually coded time markers 16 as periodically moving linearly with respect to the time indicia 15 on the 24-hour scale 15, such that the alignment of the time markers with respect to the 24-hour time indicia indicates the local time of each geographical time zone shown on the map 20.

Referring again to FIGS. 10 and 11, according to this alternative embodiment of the invention, the timebase 35 may periodically generate a low latency strobe signal 36 and present it to the CPU 30, in the same manner as described previously. Upon receipt of the strobe signal, in the Mercator projection embodiment, CPU 30 retrieves and executes a stored series of instructions from program memory 33, which may then cause it to fetch and copy the data comprising the reference map image 42 into a suitable scratch or buffer area of memory (not shown in the Figures) for display image formulation.

CPU 30 then executes a further stored series of instructions which may cause it to again sequentially iterate over the geographical time area records 45, reading from timebase 35, comparing the current values of the date mantissa 38 and time mantissa 37 with the DST onset date and time, and determining the correct UTC offset in force within each geographical time area. In this case following a variant stored instruction sequence, each area's UTC offset may then be divided by the 24 hours of a normal daily Earth revolution cycle, and the resulting fraction multiplied by the width of the reference Mercator map image 42, to compute the linear offset to the left or right of the prime meridian of the projection for the location of each of the time zone time markers 16. CPU 30 may then execute instructions to plot each marker at the resultant marker position offset, and apply visual indications or colours to correlate the marker with the geographic time area on the buffered map image.

After all time zone time markers and map markings have been applied, CPU 30 may then execute a series of instructions to plot the linear time scale 15, optionally applying any desired day/night shadings. This operation may comprise plotting the time scale 15 to the scratch buffer such that the current UTC time reading from timebase mantissa 37 is aligned with the prime meridian of reference map image, continuing to plot the ascending indicia rightwards until the right hand edge of the map image has been reached. At this point the remaining indicia time scale 15 may be plotted ascending rightwards from the left hand edge of the map image until the scale has been completed. At this point, the final step of image manipulation is to copy the completed rendition of map image 19 from the scratch buffer to the viewable display interface 39 for presentation.

Another alternative presentation approach for the Mercator projection is possible, whereby the indicia time scale 15 is always plotted in the same reference position, and map image 20 is plotted from it's prime meridian at the intercept representing the current UTC time against scale 15, with the plotted copy of map image 42 "wrapped" at the rightwards edge of the scale, continuing then to be plotted starting at the left edge before copying for presentation.

The reader will note in the preceding discussion that regardless of the cartographic projection used for the reference map 42, the actual data storage formats and units used for the storage and arithmetic manipulation of times and angles are not critical, as long as units are kept constant throughout calculation. Depending on the design constraints, either integer, or fixed or floating point decimal representations may be used for scalar values, and angular measurements may be represented in any convenient format, for example decimal degrees, radians, grads, or mils.

It will also be evident that there are possibilities to effect certain run-time optimizations on the above image processing sequence. For example, in large geographic areas such as North America which apply DST correction simultaneously, it may be useful to have stored pre-generated subimages of the Daylight Savings and Standard Time circumstances, possibly with time zone time markers already computed and applied, cached and available for direct copy to the scratch buffer. Also, in a computing system with a dynamically varying load and constrained available resources, images may be pre-assembled during lower loading periods and indexed for the relatively low-computation effort of copying to display later when resourcing is tight.

The reader will also note that reference world image 42 need not be restricted to a cartographic projection, but may also be a suitably transformed and scaled representation derived from a satellite image or composite of images of the Earth, potentially with mapping markings superimposed, and that false colouration or other image manipulation techniques may be used for the visual coding of the geographic time zone areas.

In one optional and simplified embodiment of the current invention, a number of different world images may be provided and copied to the display interface 39 at certain appropriate times of the year. By changing the map on these appropriate days to depict the visually coded geographical time zones 14 that are in force for that given day, it is possible to keep a relatively accurate world time display 13 with a great reduction of computational requirements. According to this optional variant, a series of image changes or "swaps" at a number of times throughout the year may be able to substantially correctly depict the time in many locations of interest throughout the globe. In some cases it may be desirable to have many versions of maps in order to depict time zone adjustments to a desirable resolution within geographic regions.

Figure 3:
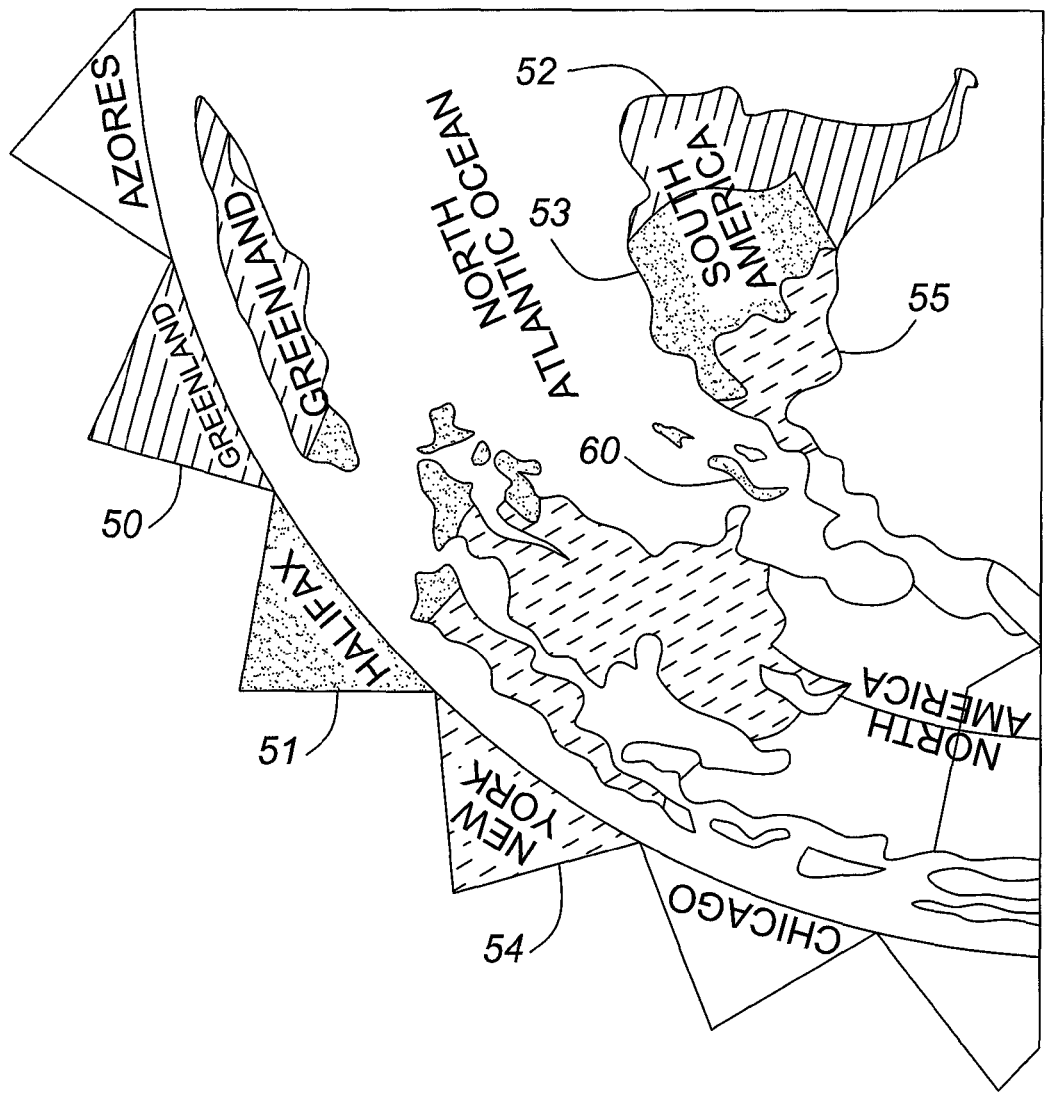
FIG. 3 is a detailed view of a section of the clock face of the invention as in FIG. 2.
Figure 4:
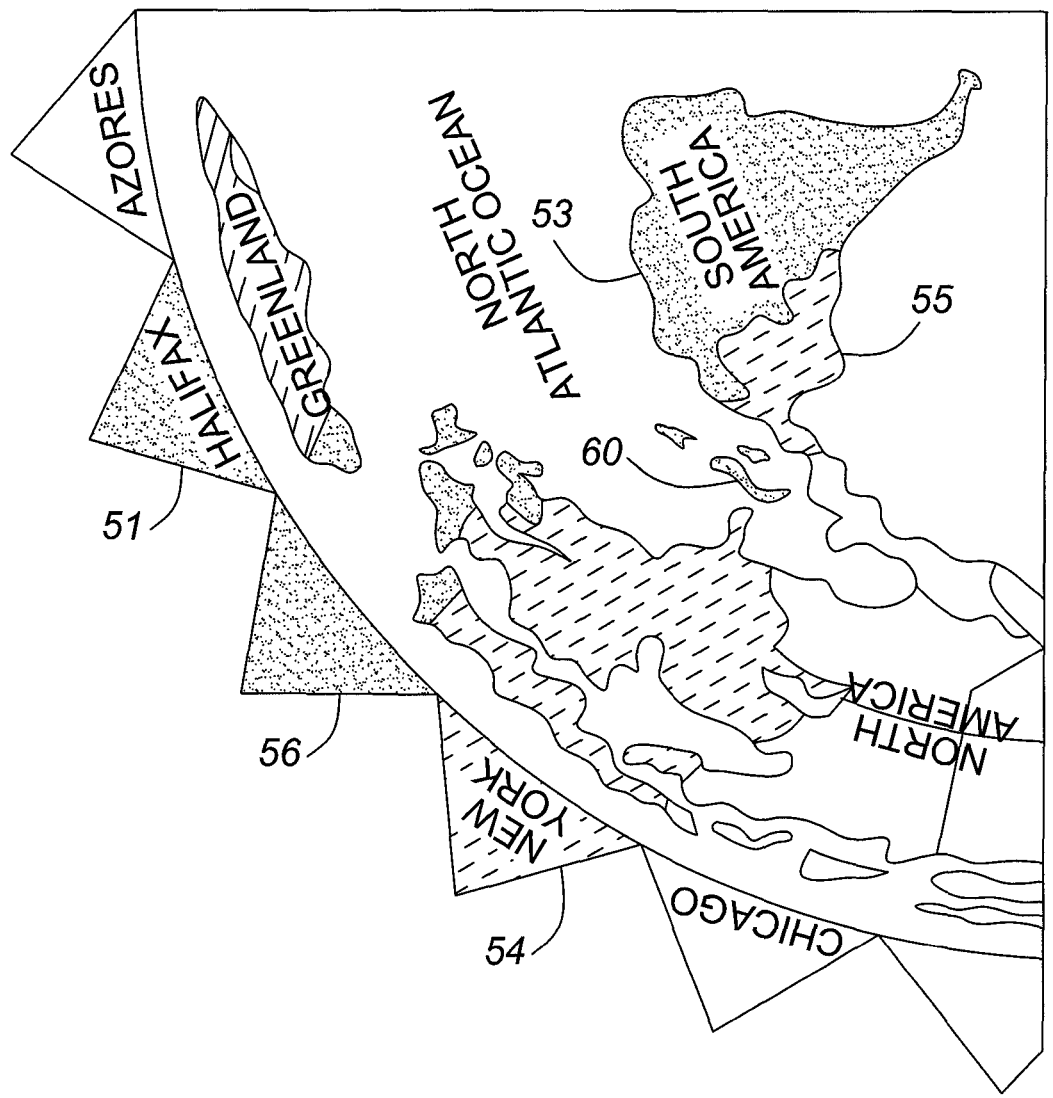
FIG. 4 is a detailed view of a section of the clock face of the invention as in FIG. 3 more clearly showing the addition of the temporary time zone time marker and the removal of the Greenland time zone time marker.

In the preferred embodiment of the invention, the apparatus for effecting an electronic presentation of a clock is provided with a facility for Daylight Saving adjustment. The role of this feature is to adjust the clock display for regional time changes due to Daylight Saving Time. FIGS. 3 and 4 are detailed depictions of a manner of altering the clock face of FIGS. 1 and 2 in order to adjust the map and clock to conform to DST. In FIG. 3, the position of, and optionally the nature of, the coloured or otherwise visually coded time markers 50, 51 and 54 correspond to regions 52, 53, and 55 respectively. As discussed previously, the display of such time markers 50, 51, and 52 may be shifted clockwise or counter-clockwise by a distance corresponding to the change arising from entering or leaving Daylight Saving Time. Thus in changing the position of any time marker, the indicated local civil time of the corresponding geographical time zone may be indicated as being advanced or retarded in accordance with Daylight Saving Time requirements.

By examining FIGS. 3 and 4, an example of such a time marker shift can be seen. FIG. 3 depicts a section of the map of the current invention prior to a DST-related adjustment, while FIG. 4 depicts this same map after a time zone change has begun. Greenland, Halifax and New York time zone time markers 50, 51, 54 with associated Greenland, Halifax and New York geographical time zone 52, 53, 55 can be clearly seen. Each of these time markers is in this case hatched to correspond with its associated geographical time zone. In practicing the invention, this visual correlation may be indicated by alignment of colours, hatching, or other visual encoding cues.

Turning now to FIG. 4, it can be seen that the Greenland time zone time marker 50 has been removed. A temporary time zone time marker 56 is inserted in its place, between the Halifax and New York time markers 51 and 54. The temporary time marker 56 is in this case visually coded in the same manner as the time marker 51 above it. Furthermore, the geographical area 52 that was in FIG. 3 previously associated with the Greenland time marker 50 is now in FIG. 4 coloured to be associated with the newly added time zone time marker 56. This temporary time marker 56 is a "placeholder" that acts as a time marker as the process of sequentially adjusting the time markers 16 and the boundaries of the geographical time zones 14 takes place. As time passes on a DST-enacting day, each time zone on the world map presentation will be altered in a different way at a different time, so a series of such alterations is necessary.

Figure 5:
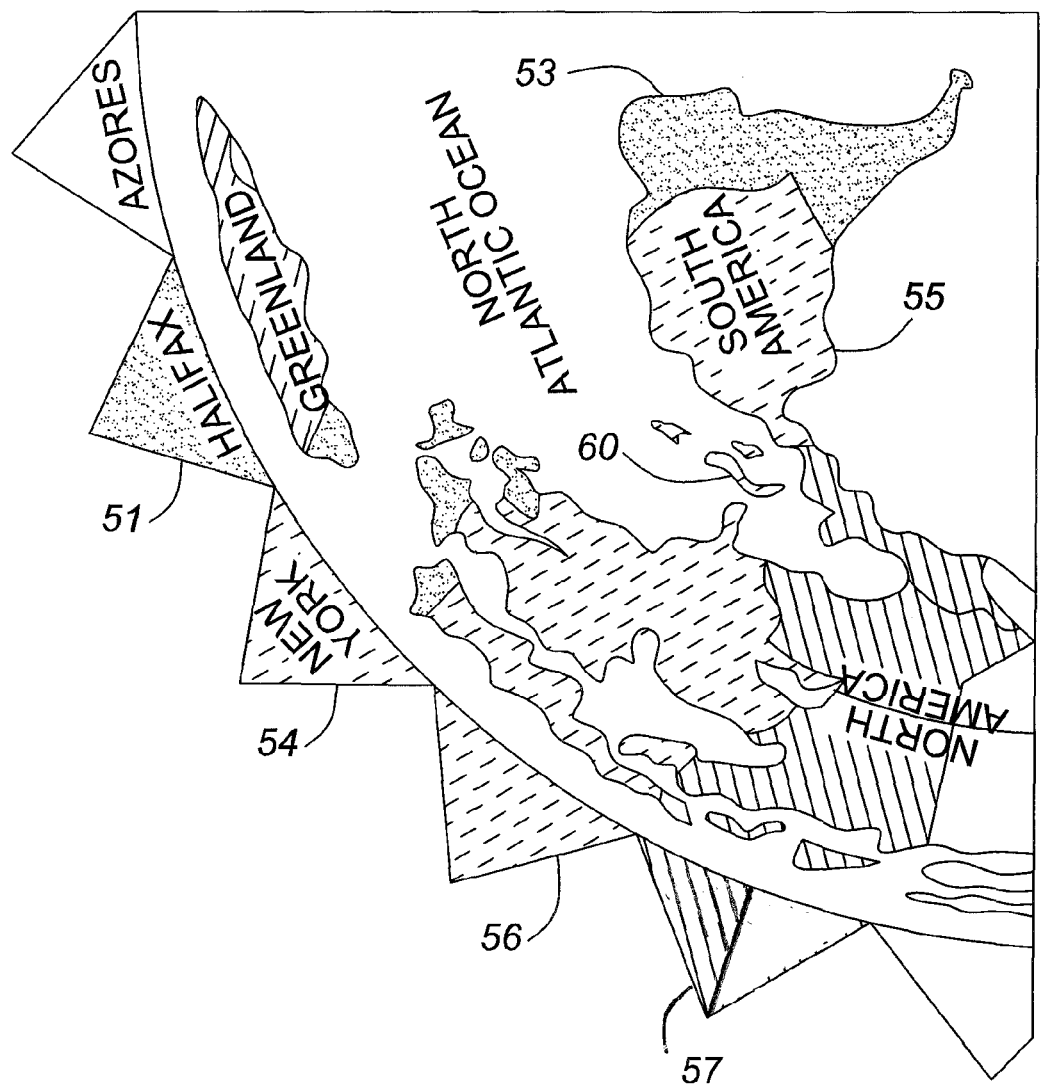
FIG. 5 is a detailed view of a section of the clock face of the invention as in FIG. 4 more clearly showing the movement of the temporary time zone time marker.

Simultaneously with the insertion of the temporary time zone time marker 56, the map is altered to allow sections that do not observe DST or that observe DST in a different manner than most countries to be accurately depicted on the map. In instances where only a territorial fraction of a particular time zone observes Daylight Saving Time, the specific sub-region within such time-zone which does not observe Daylight Saving Time may be recoloured in the display to adopt a colour code corresponding to an adjacent time zone having the same, post-DST change time. In FIGS. 4 and 5, a section 60 of the map is originally associated with the Halifax time zone time marker 51, but as this area does not in this case observe DST, when the rest of the geographical areas nearby adjust for DST, section 60 becomes associated with the New York time zone time marker 54.

FIG. 5 depicts a further feature in the process of adjusting the map for DST, after another hour has passed and the New York time zone is to adjust for DST. In this case, the clock face 13, already adjusted for DST as described above in the description of FIGS. 3 and 4, has the temporary time zone time marker 56 shifted, now being between the New York and Chicago time markers 54 and 57. FIG. 5 also shows the time zone time marker for the United States mid-west, "Chicago", shared with the time zone time marker for a further region to the west with the usual equilateral triangles reduced to half size in order to share space and indicate the same time. This can address the case where an adjacent region does not shift to daylight savings.

As may be seen in FIGS. 1 and 2, shifting the time indicators 16 in their relative positions around the periphery of the world map 18 allows the presentation to accommodate a change to or from Daylight Saving in a corresponding geographical time zone area 14 without necessarily changing the overall colour or other visual coding of the corresponding territorial region. In regions where the majority of territories shift in response to Daylight Saving Time, this procedure of shifting the time indicators has the advantage of minimizing departures from any traditional or preferred visual coding provided to geographic time zone areas. Correspondingly, the expectations of viewers as to the colours of specific geographical time areas 14 are minimally disrupted. Thus the appearance of the world map presentation in whatever cartographic projection is adopted will be largely undisturbed for the benefit of the perception of persons viewing this presentation. Although some visual coding within certain geographical time areas may change, for the most part the individual sections of the map are able to retain substantially the same coding.

Figure 6:
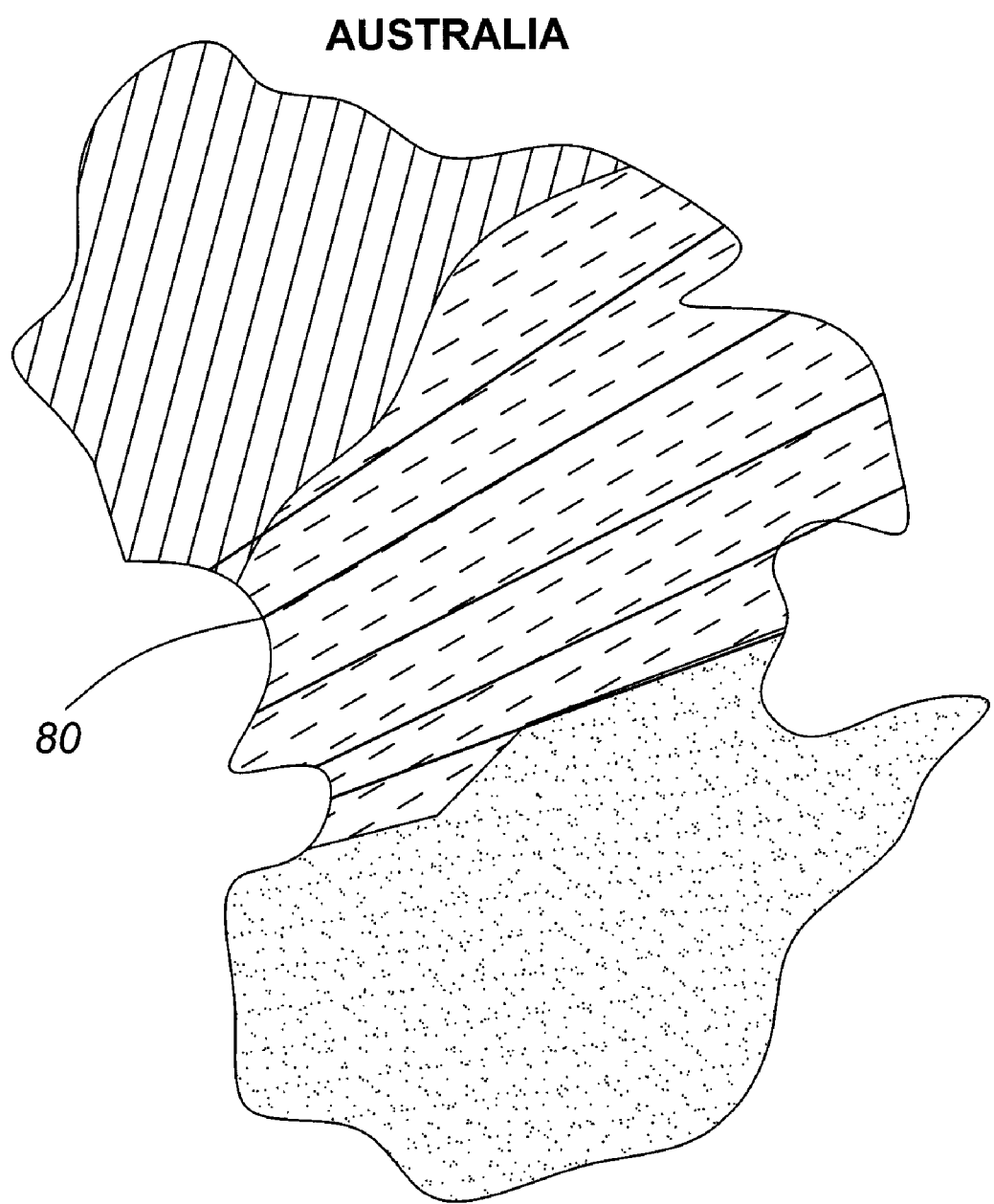
FIG. 6 is a detailed view of a section of the clock face of the invention that depicts one manner of showing a time zone that is offset by a half-hour.

When a geographical region deviates from the more "standard" time neighboring zones by less than an hour, as for example, Australian Central Standard Time's offset of 30 minutes from Western and Eastern Australian zones, such intermediate zones may be provided with a visual encoding pattern that indicates that it falls between two bordering time zones. In one embodiment, as shown in FIG. 6, the timezone of Australian Central Standard Time 80 is shown as being striped and hatched. Such marking may either indicate that the time in that time zone corresponds to the time in between the two adjacent time zones, or in the case of colour marking, the visual coding may be such that the colour used to depict the geographical region 80 is the subtractive mixture of the colours that make up the separate, adjacent time zone regions. For example, if a region is in between a blue time zone and a yellow time zone, and the time in that region is offset from the red and yellow time zones by half an hour, it might be displayed as an orange time zone to indicate that is the combination of the two.

Rather than adopt an additional colour for such a half-hour geographic areas 14 and time zone time markers 16, the colour of a nearby adjacent time markers may be adopted with the addition of crosshatching or other modification to visually distinguish them both from the adjacent neighbors. Optionally, with such an additional distinctive feature as crosshatching applied to a geographic area, the depiction of an additional intermediate half-hour time zone time marker 16 may be avoided. Instead, the user may simply understand that crosshatching is an indication of a one half hour time shift, as for example a half-hour advancement in time in the case where the intermediate time zone carries the background colour of the next adjacent time zone territory in the counter-clockwise direction.

In an alternative embodiment, the presentation of the clock face 13 may adjust the clock display for regional time changes due to Daylight Saving Time through selectively redistributing the colour coding provided to one or more geographical time regions. The redistribution is effected so that that appropriate geographical time zone regions become associated with new time indicators which bear the same colour and correctly indicate their local time. In this embodiment, no shifting in the position of the individual coloured time indicators 16 occurs.

In the case of regions 14 which are offset with respect to time on the half hour in comparison to the nearby regions, additional time indicators 16 beyond the normal 24 can be provided. If the normal time indicators 16 are triangular in form, shaped as for example equilateral triangles, then additional triangles or other indicator images may be inserted halfway between adjacent triangles.

In another alternate embodiment of the current invention, it is possible to combine the clock of the current invention with an organizer/address book system, whereby a user is able to visually coordinate a contact's location or suspected location with the contact's time zone on the world time display 13.

In such an embodiment as seen in FIG. 7, and with again reference to the display controller block diagram of FIG. 10, the world time display is provided with a user data entry and display area 90. The user may thereby enter a series of contact records to be registered and indexed for later recall, this contact data may be read from user input interface 40 and stored directly in data memory 34, be imported or accessed from another co-resident software application, or be remotely accessed from an ancillary off-board data store. These contact data records may comprise specifics such as the contact's address, telephone number, a direct entry of the contact's time zone, and current contact location information, possibly derived from a GPS receiver or other automatic positioning apparatus.

Figure 7:
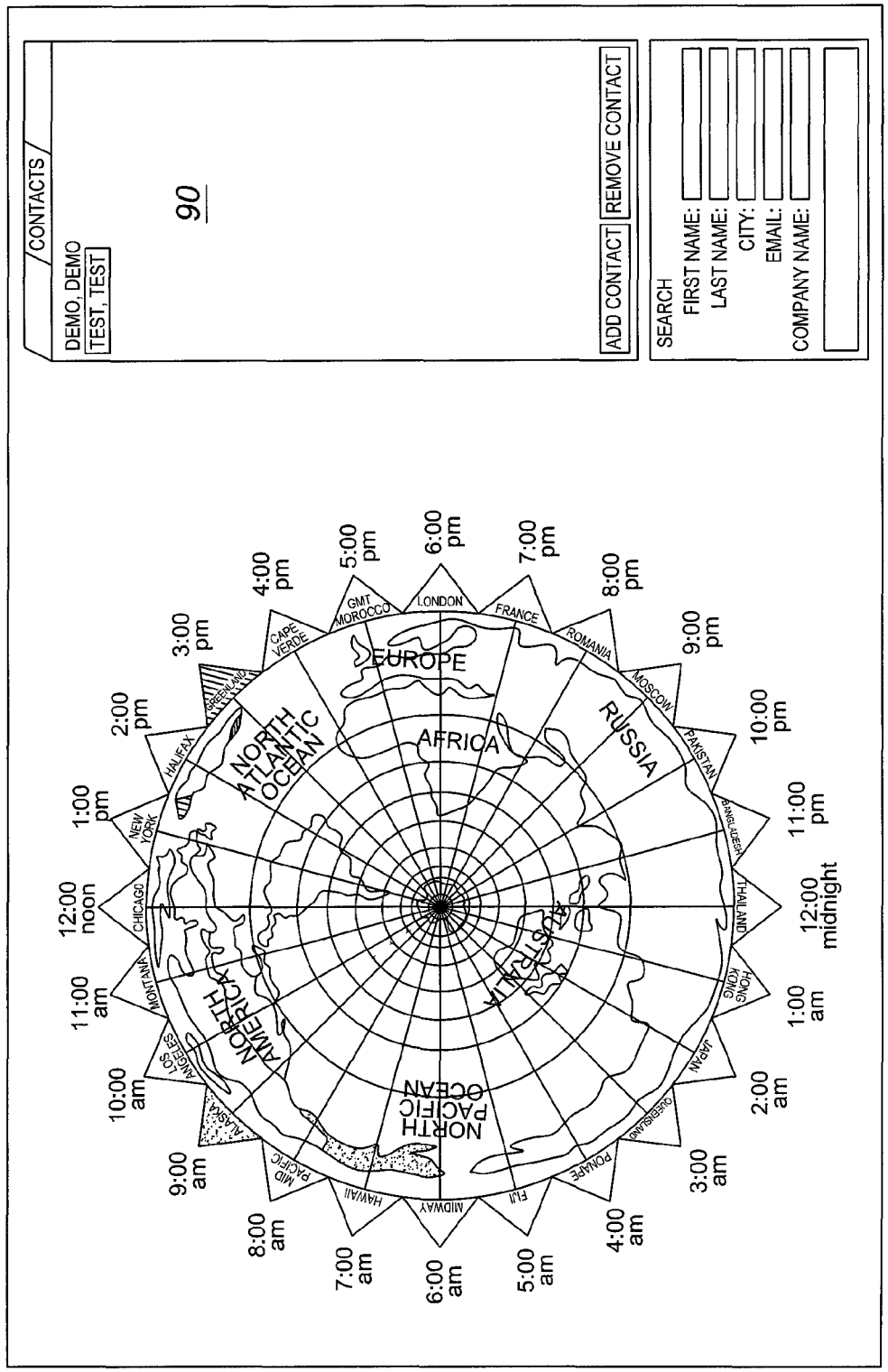
FIG. 7 is a view of an address book featuring the clock of the invention which depicts a modified South polar projection of the Earth with a series of time zone time markers that correspond to areas of the world map, and the time zone time markers pointing to their associated time indicators.

After the location of a contact is accessible to this embodiment of the software, it then becomes possible to use the contact information in combination with the world map presentation 13 of the current invention to visually display the time zone of a user. As seen in FIG. 7, if for example, the "TEST, TEST" contact is located in the GMT−5 time zone, the user's selection of this entry in data entry and display area 90 may cause the geographic time area 14 and associated time zone time marker 16 corresponding to the contact's location to have its colour or visual coding changed in order to highlight or otherwise visually discriminate it on the display. This highlighting may be done in any number of ways, such as a redrawing of the relevant area 14 and marker 16 in a specified colour, cyclical re-drawing in alternating colours or visual encodings in order to cause the area and marker to visually pulsate, or by dimming the presentation of other areas and markers of the presentation, to direct the viewer's eye focus.

Additionally, the display controller 25 may also prepare and display a customized rotation of the presentation image, as by rotating of translating the map image and markers in order to move the contact's geographic time area 14 and indicator 15 to a position that is easy to locate, such as the topmost position or the rightmost position.

In one optional embodiment, the display controller 25 may, from the customized image provided above, present or provide a user control which, when activated, will present a list of countries within the time zone and/or cities or other important references within the geographic time area which qualify as significant presentable information, such that a user can confirm that they have selected the correct time zone that includes the target geographic entity. The listed references may include information pertaining to entities providing commercial services, such as hotels or other such facilities, located within the user-selected geographical area.

According to this optional embodiment, the significant presentable information may be pre-programmed into the data memory 34 of display controller 25, imported or accessed from another co-resident software application, or remotely accessed from an ancillary off-board electronic data storage system or service. Preferably, this data store is provided in the form of an electronic database composed of searchable and randomly accessible records, which may be indexed according geographic time area and classes of entity. For example, the records may be indexed by telephonic area code or other physical or logical addressing, the types of services provided, the entity's commercial affiliation or ownership, and service particulars and pricing.

Turning again to FIG. 1, in yet another embodiment of the current invention, the clock face 13 could be manually adjustable by the user. For example, if a user located in New York (GMT−5) wanted to contact someone in London (GMT+0) at "3 pm" London time, the user could rotate the map presentation 18 with its associated peripheral time zone time markers 16 until the marker for London pointed to the point on annular time scale index 15 corresponding to "3 pm". When the time marker for London is pointing to the "3 pm" numerical time indicator, a user is easily able to see that the time marker corresponding to New York points to the numerical time indicator corresponding to "10 am". In a further embodiment of the invention, the clock face 13 might "snap back" to tracking and displaying the current time, either on the press of a button, or automatically after a predetermined amount of time has passed.

In another optional variant of the invention, the user may be provided an input control which allows for the setting of a temporary hypothetical date and or time, either in the past or future. According to this optional function, the display controller would prepare a world time image in the same manner as the periodically updated instruction sequence for routine timekeeping, and display the time zone circumstances that would have or will be in effect at that instant. Again according to this optional feature, the clock face 13 might "snap back" to tracking and displaying the current time, either on the press of a button, or automatically after a predetermined amount of time has passed.

Although the foregoing description relates to specific preferred embodiments of the present invention and specific processes for the electronic presentation of a clock with time zones as presently contemplated by the inventor, it will be understood that various changes, modifications and adaptations, may be made without departing from the spirit of the invention.

Conclusion

The foregoing has constituted a description of specific embodiments showing how the invention may be applied and put into use. These embodiments are only exemplary. The invention in its broadest and more specific aspects is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. An electronically controlled graphic display system for determining a local civil time of two or more time zones in the world comprising:
    (a) a cartographic projection of the earth surface or a portion thereof, having an outer periphery, the projection being divided into a plurality of geographical time areas each corresponding to a civil time zone, the geographical time areas being coded so as to be visually distinguishable at least from adjacent areas;
    (b) a series of time zone time markers which are similarly coded to correspond with associated, geographical time areas, such markers being disposed along at least a portion of the outer periphery of the cartographic projection;
    (c) a time scale including a plurality of time indicators disposed along said portion of the outer periphery of the cartographic projection, the time zone time markers being positioned to correspond to respective, associated time indicators included in the time scale whereby each time indicator is respectively associated with a geographical time area provided on the projection;
    (d) an electronic graphic display for presenting the cartographic projection of the earth surface or a portion thereof along with the timescale and time zone time markers, and
    (e) an electronic display controller connected to the graphic display having access to a clock capable of providing the local effective civil time corresponding to each geographic time area, and having access to a digital record database containing a list of the geographic time areas, their locations on the cartographic projection, and the effective date that each geographical time area adjusts its local civil time to introduce or remove daylight savings time;
    wherein the controller, by reference to the digital database, adjusts the display to maintain the correspondence between the time zone time markers and the associated time indicators to display the actual time in each geographical time area by:
    i) periodically changing the relative positions of the time zone time markers disposed along the outer peripheral portion of the cartographic projection with respect to the time indicators such that the alignment of the time zone time markers with respect to the time indicators continues to indicate the local time of geographical time areas, or
    ii) periodically changing the coding of the geographical time areas without changing the coding of the associated time zone time markers such that the geographical time areas have the same coding as time zone time markers that are aligned with the appropriate time indicators to indicate the correct, actual, time within each of the geographic time areas for a given calendar date, so as to accommodate for changes with respect to daylight savings time.

2. The electronically controlled graphic display system of claim 1 wherein the controller adjusts the display by periodically changing the relative positions of the time zone time markers disposed along the outer peripheral portion of the cartographic projection with respect to the time indicators without changing the coding of the time zone time markers whose relative position is changed.

3. The electronically controlled graphic display system of claim 2 wherein, when the position of a time zone time marker along the outside peripheral portion is changed to be positioned to correspond to a time indicator already associated with another time zone time marker, the two time zone time markers share the location along at least a portion of the outer periphery of the cartographic projection with both indicating the same associated local time.

4. The electronically controlled graphic display system of claim 1 wherein the controller adjusts the display to maintain the correspondence between the time zone time markers and the associated time indicators to display the actual time in each civil time zone including by reference to the digital record database by periodically changing the color of the geographical time areas such that the time zone time markers are aligned with the appropriate time indicators to indicate the correct, actual, time within each of the geographic time areas.

5. The electronically controlled graphic display system of claim 1 wherein the cartographic projection of the earth surface or a portion thereof and time zone time markers are static and the time scale with its plurality of time indicators scrolls along said portion of the outer periphery of the cartographic projection in accordance with the passage of time.

6. The electronically controlled graphic display system of claim 1 wherein the time scale with its plurality of time indicators is static and said portion of the outer periphery of the cartographic projection of the earth surface or a portion thereof and time zone time markers scroll past the time indicators of the time scale along in accordance with the passage of time.

7. The electronically controlled graphic display system of claim 6 wherein the cartographic projection of the earth surface or a portion thereof is a Mercator projection and the cartographic projection scrolls past the time scale.

8. The electronically controlled graphic display system of claim 5 wherein the cartographic projection of the earth surface or a portion thereof is a Mercator projection and the time scale scrolls past the cartographic projection to indicate the passage of time.

9. The electronically controlled graphic display system of claim 1 wherein the cartographic projection of the earth surface or a portion thereof is an extended, south polar projection that depicts recognizable portions of the northern hemisphere and the cartographic projection rotates past the time scale.

10. The electronically controlled graphic display system of claim 1 further comprising a user input control which allows the user to input a hypothetical time or date or combination thereof and wherein, upon input from the user, the display is modified by the controller to present the corresponding time for the plurality of geographical time areas for such hypothetical time or date or combination thereof.

11. The electronically controlled graphic display system of claim 10 wherein the user input control allows a user to displace the cartographic projection with respect to the time scale or the time scale with respect to the cartographic projection to set the hypothetical time or date or combination thereof.

12. The electronically controlled graphic display system of claim 10 whereby the display controller comprises a timer and is configured, after a predetermined period of time, to reset the display to depict the real time for the plurality of geographical time areas.

13. The electronically controlled graphic display system of claim 1 in combination with a location reference database, including data points associated with specific time zones and activation means whereby a user may select and invoke a specific data point, wherein the controller is configured so that, when a user invokes the specific data point, the associated geographical time area becomes highlighted.

14. The electronically controlled graphic display system of claim 13 wherein the associated geographical time area becomes highlighted by becoming colored white.

15. The electronically controlled graphic display system of claim 13 wherein the data point is a designation of information selected from any one of the items on the following list: a country, a city, a phone number with an area code and particulars for a specific person associated with a time zone.

16. The electronically controlled graphic display system of claim 1 wherein the time zone time markers incorporate a designation or code for a related geographic location present within the associated geographical time area.

17. The electronically controlled graphic display system claim 1 comprising highlighting activation means whereby a user may select and highlight a specific geographical time area in combination with a significant information reference database including significant information data of one or more classes associated with specific geographical time areas, the system further comprising significant information activation means whereby a user may select and invoke a class of significant information data, wherein the controller is configured so that, when a user invokes the class of significant information data then specific significant information data within such class related to the specific geographical time area that has become highlighted is presented within the display.

18. The electronically controlled graphic display system of claim 17 wherein the significant information data that is displayed is a designation of information selected from any one of the items on the following list: a country, a city, an area code, particulars for a specific person associated with the highlighted geographical time area and particulars for one or more entities providing commercial services within the geographical area.

* * * * *